United States Patent
Bushnell et al.

(10) Patent No.: US 6,763,668 B1
(45) Date of Patent: Jul. 20, 2004

(54) UNIBODY MODULAR BUS AIR CONDITIONER

(75) Inventors: Peter R. Bushnell, Cazenovia, NY (US); Robert C. Reimann, LaFayette, NY (US); Christopher Repice, Camillus, NY (US); Mark Colton, Clay, NY (US); Xuqiang Liao, East Syracuse, NY (US); Gawain Mundy, Liverpool, NY (US); Stephen Stopyra, Syracuse, NY (US); Belin Czechowicz, Dewitt, NY (US); Suresh Duraisamy, Liverpool, NY (US); Timothy R. Campbell, Marcellus, NY (US); Dennis Stone, Clay, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/429,388

(22) Filed: May 5, 2003

(51) Int. Cl.[7] .................................................. B60H 1/32
(52) U.S. Cl. ............................. 62/89; 62/244; 62/507; 62/DIG. 16

(58) Field of Search .................... 62/239, 244, DIG. 16, 62/89, 507, 427, 428

(56) References Cited

U.S. PATENT DOCUMENTS

| | | | | | |
|---|---|---|---|---|---|
| 5,605,055 | A | * | 2/1997 | Salgado ....................... | 62/244 |
| 5,632,330 | A | * | 5/1997 | Drucker et al. ............. | 165/151 |
| 6,282,912 | B1 | * | 9/2001 | Mannerheim ................ | 62/244 |
| 6,295,826 | B1 | * | 10/2001 | Lee .............................. | 62/244 |
| 6,415,620 | B1 | * | 7/2002 | Ferdows ....................... | 62/244 |

* cited by examiner

Primary Examiner—William E. Tapolcai
(74) Attorney, Agent, or Firm—Wall Marjama & Bilinski LLP (57) ABSTRACT

Rather than having a frame into which, or upon which, an air conditioning system is mounted, a bus rooftop air conditioning module has a unibody which is formed partially of structural members interconnected to the tube sheets of the evaporator and condenser coils to form a structural body which supports the components of the system. In this way the coil tube sheets combine with other structural members to form the supporting body.

15 Claims, 9 Drawing Sheets

UNIBODY MODULAR BUS AIR CONDITIONER

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system for the rooftop of a bus.

It is recognized, that because of the wide variety of bus types and application requirements, it has been necessary to provide many different types and variations of air conditioning systems in order to meet these different requirements and vehicle interfaces. As a result, the manufacturing and installation costs, and sustaining engineering resources that are necessary in order to properly maintain and service these units, are relatively high.

The common approach for bus rooftop air conditioners is to provide a base frame of rather substantial structural members. The various components of the system are then mounted on or within the base frame, which is then attached to the bus rooftop. Such a frame adds significantly to the cost of a system.

Also associated with the existing bus air conditioning systems is the problem of a component failure causing a compete loss of the air conditioning capacity. That it, with a single large unit as is now customary, failure of that unit such as, for example, a leaking hose causing loss of refrigerant, an electrical failure leading to inoperation of one of the components such as a fan, or a compressor failure, the entire unit is inoperable and no air conditioning can be provided to the unit. In such a situation, it would preferable if partial capacity could be maintained in order to provide a "limp home" capability.

Traditionally, the condenser coils and fans have been located near the centerline of the bus rooftop, whereas the evaporator coils and fans are closer to the lateral sides of the rooftop. Further, the evaporator fans are of the draw-through type wherein the evaporator fans are placed downstream of the coils and act to draw the conditioned air from the coils. This provides a uniform velocity distribution at the coil but leads to undesirable high jet flow off the fan and subsequently pushing into the bus ducting system. Also, because of the need to have the fan outboard of the coil, it has been necessary to place the coil more toward the center of the bus than might otherwise be desired. Further, draw through disadvantages include hold up of condensate due to the negative pressure at the drain pan, and hat negative pressure can draw back undesirable gases from the bus lower are, such as exhaust gases.

It is therefore an object of the present invention to provide an improved bus rooftop air conditioning system.

Another object of the present invention is the provision for a bus air conditioning system which is effective at all engine operating speeds of the bus, while at the same time does not require an oversized compressor.

Yet another object of the present invention is the provision for reducing the manufacturing, installation, and maintenance costs of a bus air conditioning system.

Still another object of the present invention is that of providing an air conditioning system that is designed for adaptability of use in various types of installation configurations.

Another object of the present invention is that of providing a "limp home" capability in the event of certain component failures.

Still another object of the present invention is the provision in an evaporator section of a bus rooftop air conditioning system for locating, the evaporator coil more toward the lateral edges of the bus.

Still another object is to avoid the problem of negative pressure at the drain pan.

Yet another object of the present invention is the provision for a bus rooftop air conditioning system which is economical to manufacture and effective in use.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air and supply air ducts on a bus.

In accordance with another aspect of the invention, rather than a large single air conditioning unit, a plurality of relatively small modules can be installed on the roof of a bus, with each being capable of operating independently of the others so as to allow for the relatively low cost mass production of identical standardized units and also provide for a limp home capability in the event of failure of one or more units.

In accordance with another aspect of the invention, each of a plurality of modules are installed in a centered relationship with respect to a longitudinal centerline of the bus and extend transversely across the width of the bus. A single unit with one condenser section and one evaporator section is provided and a double unit with two evaporator sections and two condenser sections are also provided. The number and combination of such modules installed is dependent on the total air conditioning capacity requirement of the bus, and the evaporator sections can be easily ganged to meet with a single return air opening in the bus.

In accordance with another aspect of the invention, the modules have an integrated framework in that various components are assembled in a unibody arrangement to provide structural support for the system.

By yet another aspect of the invention, each of the modules include all the necessary components with electrical power being provided to the electrical components by an inverter/controller that is powered by an engine driven generator.

By another aspect of the invention, the evaporator blower is placed inboard of the evaporator coils and acts to blow air from the return air duct through the coils to be cooled and provide pressurized condensate system thus avoiding condensate hold up and introduction of external gases.

By still another aspect of the invention the evaporator section of the module has a return air plenum that spans a substantial width of the bus to thereby accommodate various sizes and types of return air interface requirements.

In the drawings as hereinafter described, a preferred embodiment is depicted; however various other modifications and alternate constructions can be made thereto without departing from the true sprit and scope of the invention.

DESCRIPTION OF THE PREFERRED EMBODIMENTS

Figure 1:
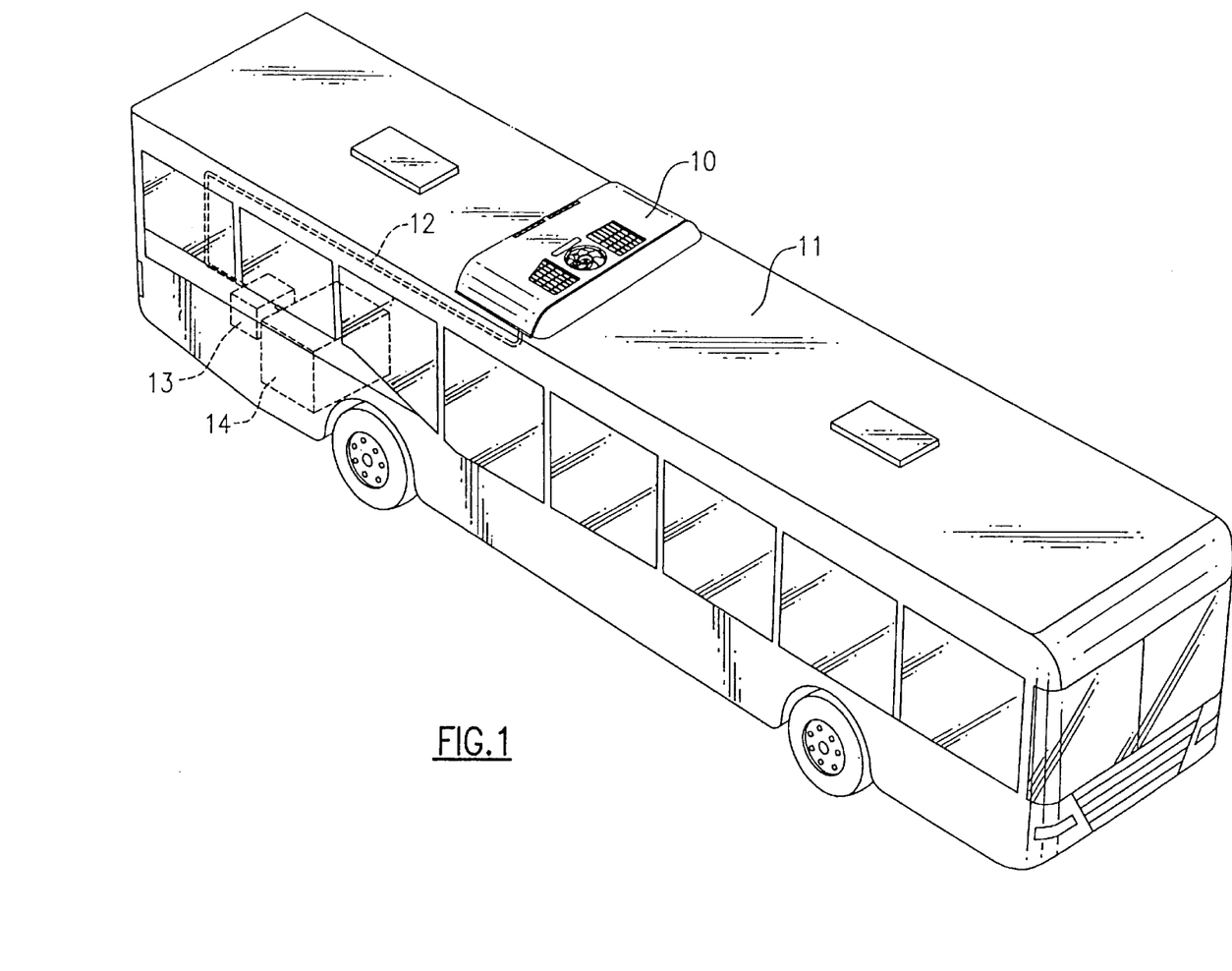
FIG. 1 is a perspective view of a singe unit module as installed on the rooftop of a bus in accordance with a preferred embodiment of the invention.

The inventive module as a single unit configuration is shown generally at 10 as applied to the rooftop 11 of a bus in accordance with the present invention. Electrical power is provided to the module 10 by way of line 12, which in turn receives its power from a generator 13 driven by the bus engine 14 as shown.

The module 10 interfaces with openings in the bus top so that fans within the module 10 cause the return air from the passenger compartment to flow upward into the module 10 where it is conditioned, and the conditioned air to then flow downwardly into supply air ducts that carry the conditioned air to the passenger compartment. The various structures and the manner in which they interface with the bus rooftop 11 will more fully described hereinafter.

Figure 2:
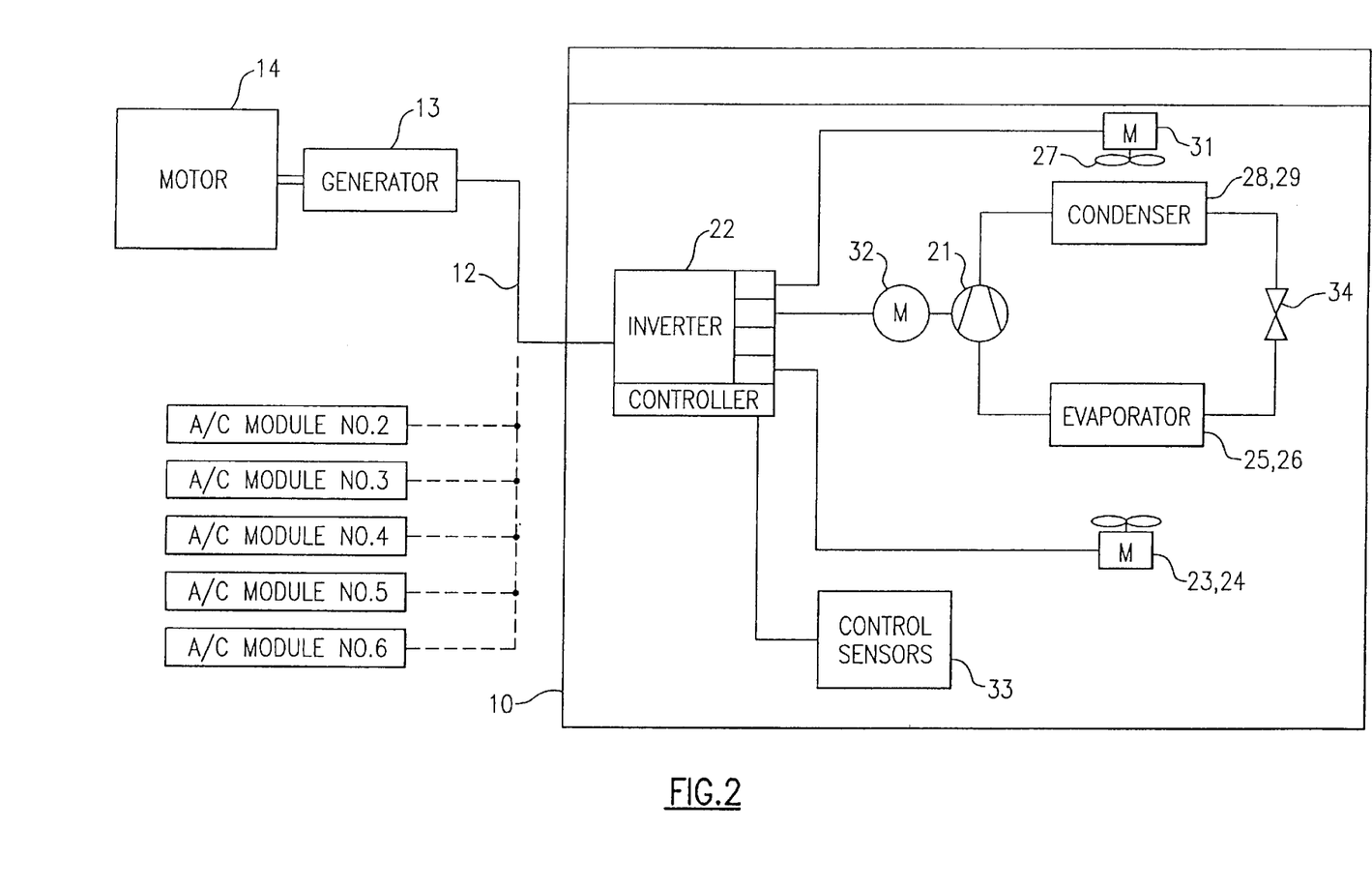
FIG. 2 is a schematic illustration of the electrical and refrigerant circuits within the module in accordance with the preferred embodiment of the invention.

In FIG. 2, the module 10 is shown with its electrical connection by way of line 12 to the generator 13 and driving engine/motor 14. An inverter/controller 22 receives AC power from the generator, or alternator, and, in turn provides discretely controlled AC power to evaporator blower motors 23 and 24, a drive motor 31 of the condenser fan 27 and a drive motor 32 of a compressor 21. A plurality of control sensors, shown generally at 33 provide feedback to the inverter/controller 22 as necessary for it to control the AC power being delivered to the various drive motors.

As will be seen, the refrigeration circuit is a closed circuit through which the refrigerant flows from the compressor 21 to the condenser coils 28 and 29 an expansion valve 34, to one or more evaporator coils 25 and 26 and finally back to the compressor 21. This refrigerant flow configuration is accomplished in a conventional manner.

It will be seen that the module 10 is self-contained with all of the necessary components including he compressor 21 and its drive motor 32, with the only input thereto being the electrical power by way of the electrical line 12. Other modules, indicated as numbers 2–6 are identically configured and are powered and controlled in the same manner. In this regard, it should be mentioned that the present invention is also applicable to a module in which the compressor is not included within the module but is rather located near and driven by the motor 14. In such case the refrigerant lines are interconnected from the compressor to the module(s).

Referring now to FIGS. 3–7, a single unit version (a double unit version thereof will be described hereinafter), of the module 10 as shown with its cover removed to include an evaporator section 36 and a condenser section 37. These two sections are fabricated separately in the factory and then brought together in parallel relationship and secured together to complete the module as will be described hereinafter. The module is intended, and is designed, to be mounted on the rooftop of a bus with each of the two sections extending transversely across the rooftop of a bus, in a straddling relationship with the longitudinal centerline thereof.

Figure 5:
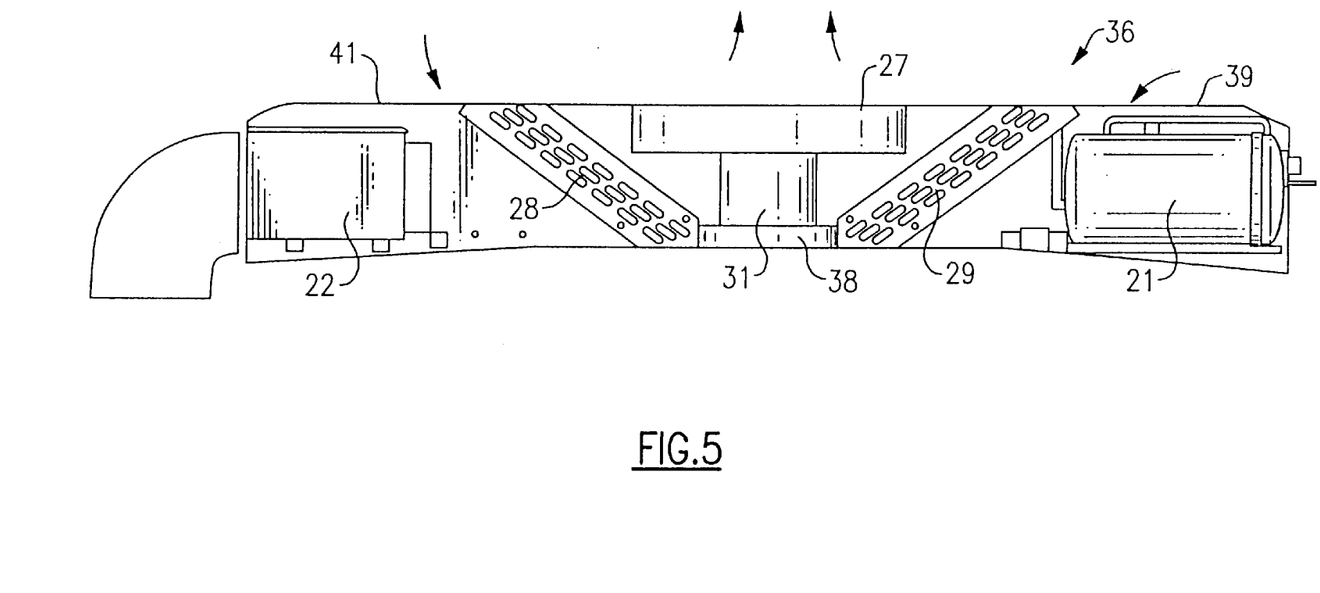
FIG. 5 is a front elevational view of the condenser section of the module.

Within the condenser section 36, the condenser fan is mounted on a base 38 with its axis oriented vertically, and connected to be driven by an electric motor 31. On either side thereof, the condenser coils 28 and 29 are mounted in a combined V shape as shown. As shown in FIG. 5, the flow of air is caused by the condenser fan 27 as shown by the arrows. Fresh air is drawn in through the fresh air intake openings 39 and 41, passes through the respective condenser coils 28 and 29, with the resulting warm air being discharged upwardly to the atmosphere by the fan 27.

It is significant to note that both the condenser section 36 and evaporator section 37 are of the "frameless" type. That is, in prior art arrangements, a framework has been provided wherein the various components are either mounted on or within the supporting framework. In the present design, the various components make up a "unibody", such that the components themselves form the framework.

Referring again to FIG. 3, a pair of V-shaped central panels (one being shown in 42) are secured at its oblique edges to the tube sheets of the respective coils 28 and 29, and at its lower horizontal edge to the base 38 by fasteners of the like. Also attached to the tube sheets of the coils 28 and 29 are the respective pairs spaced side panels 43 and 44, with the pair of spaced side panels 43 then being interconnected by an end panel 46, and the pair of spaced side panels 44 being interconnected by and end panel 47. Thus, rather than having frame members that extend the length of the module 36, the structural members are described hereinabove are fastened together, including the tube sheets of the coils 28 and 29, to jointly comprise a structural body of the module 36. A structural body thus comprises a side panel 43 that is connected to one side of the tube sheet 25, the tube sheet 25 itself, a central panel 42 that is connected at its one end to the tube sheet 25 and at its other end to the tube sheet 30, the tube sheet 30 itself, and the side panel 44 which is connected at its one end to the tube sheet 30.

Figure 3:
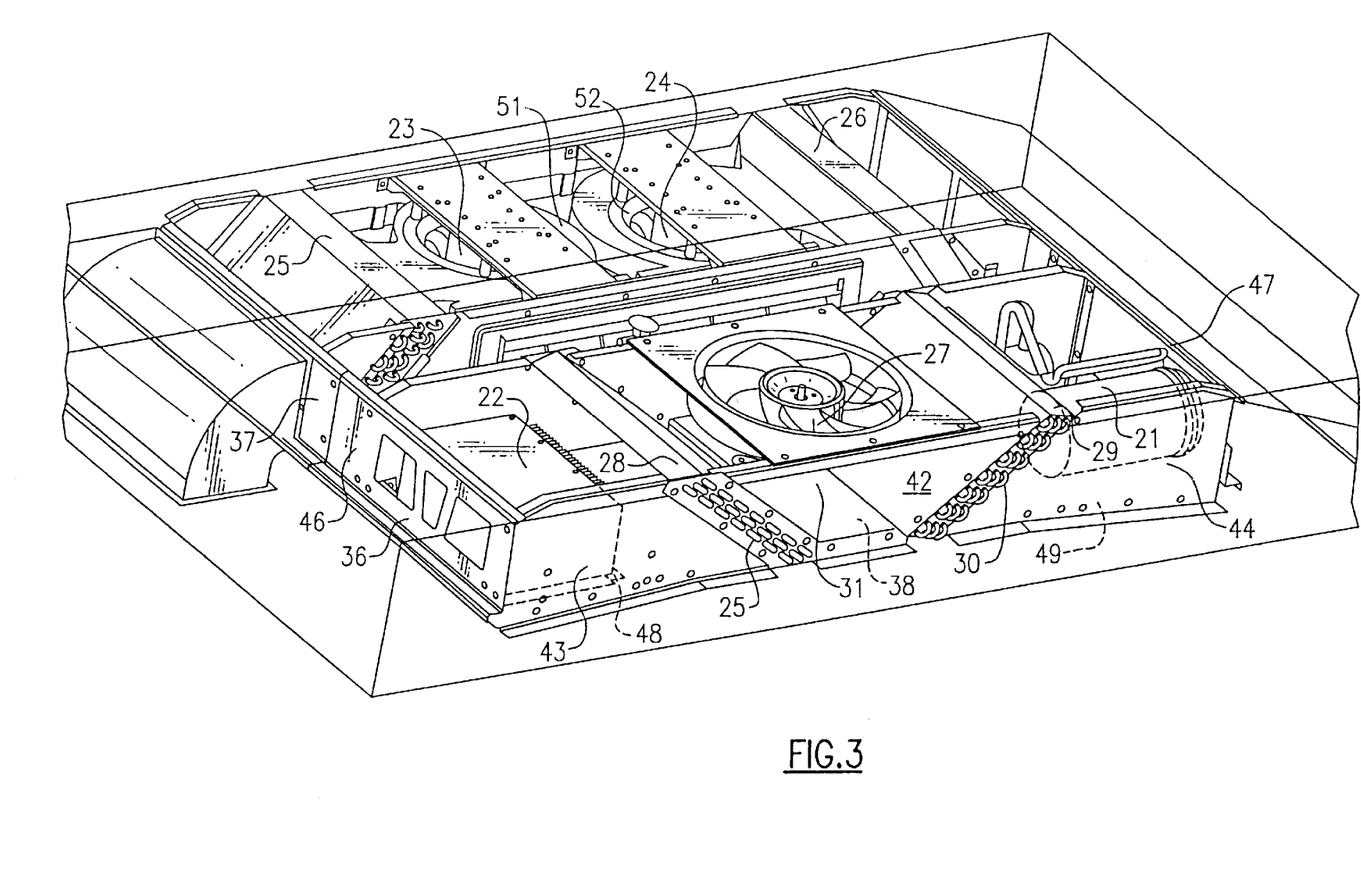
FIG. 3 is a perspective view of a single unit module with the top cover removed.

The inverter/controller 43 is mounted on a base member 48 which is interconnected to the lower edge of the side panels 43 and end panel 46, while the compressor 41 is supported by the base member 49 which is interconnected to the lower edges of the side member 44 and the end member 47.

Figure 4:
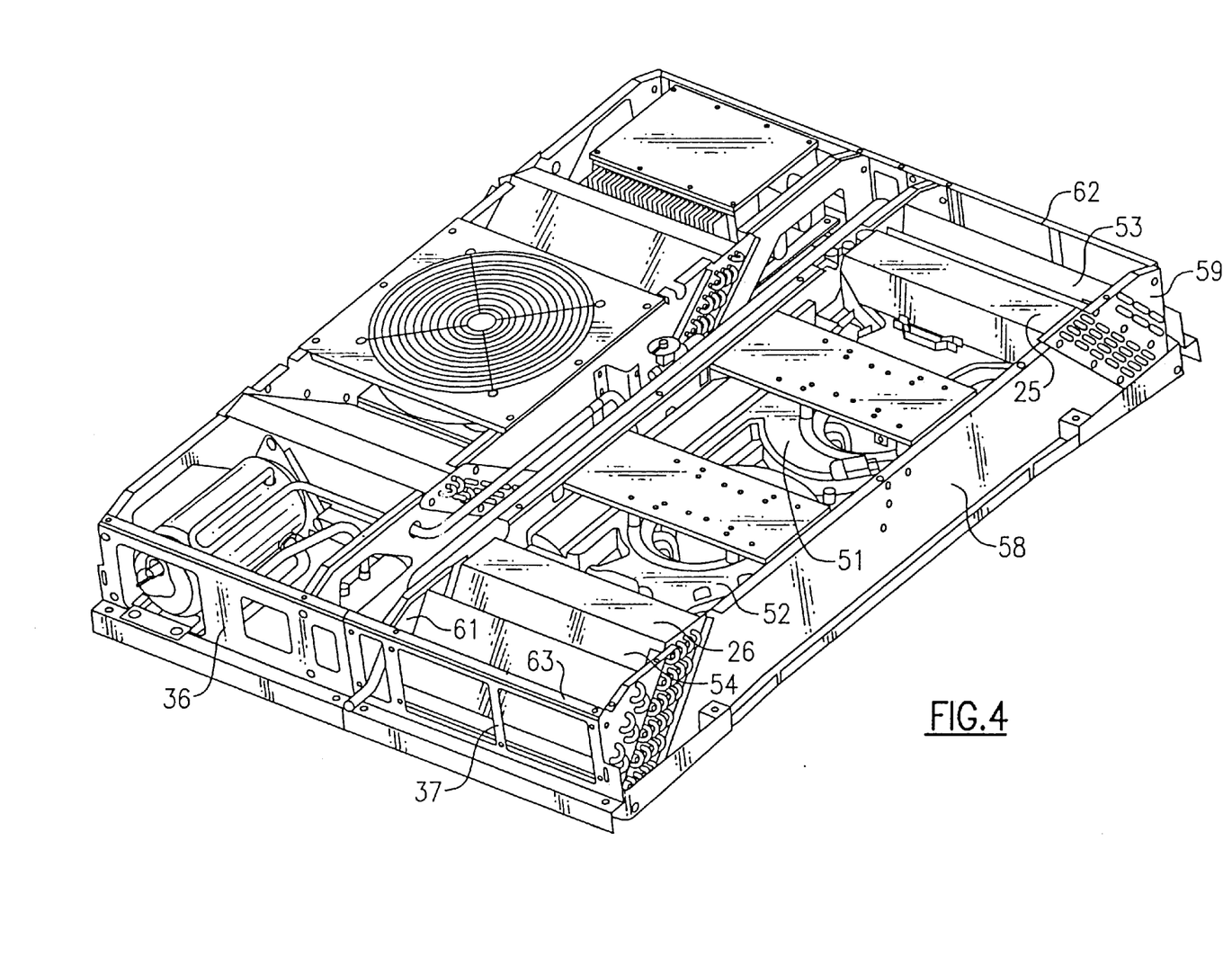
FIG. 4 is another perspective view of a single unit module with the top cover removed.
Figure 6:
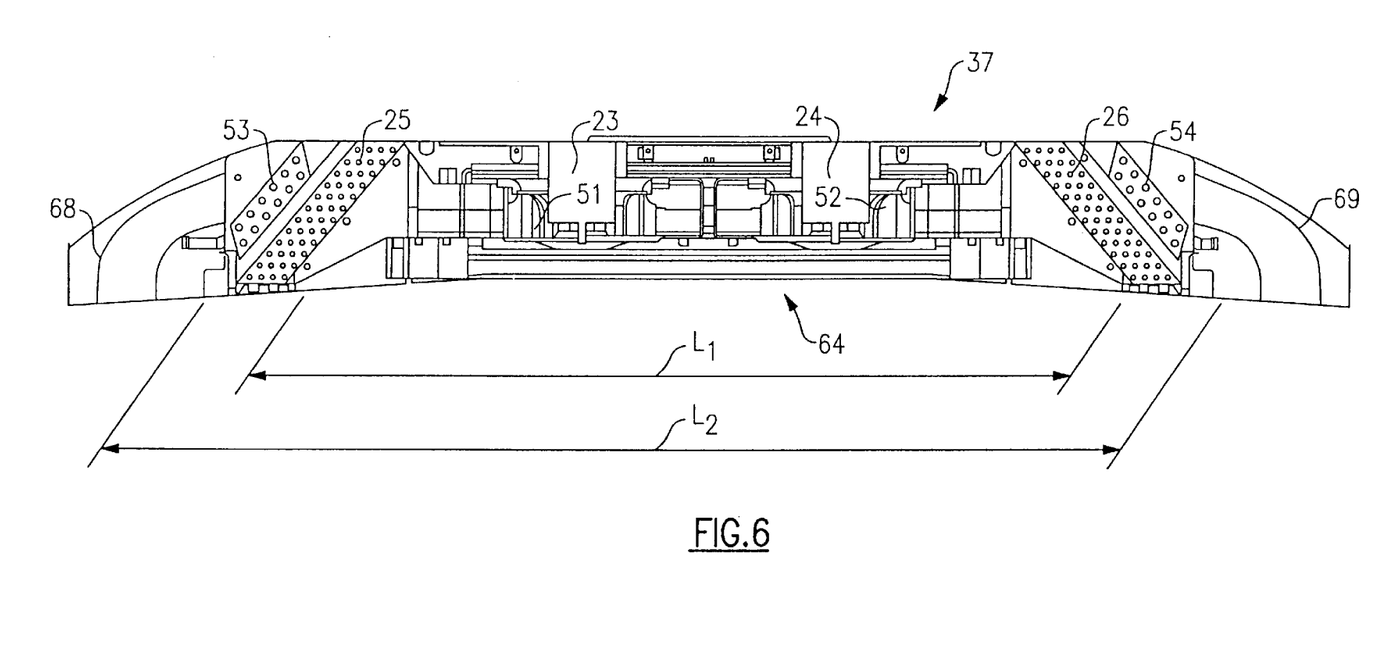
FIG. 6 is a front elevational view one embodiment of the evaporator section of the module.
Figure 7:
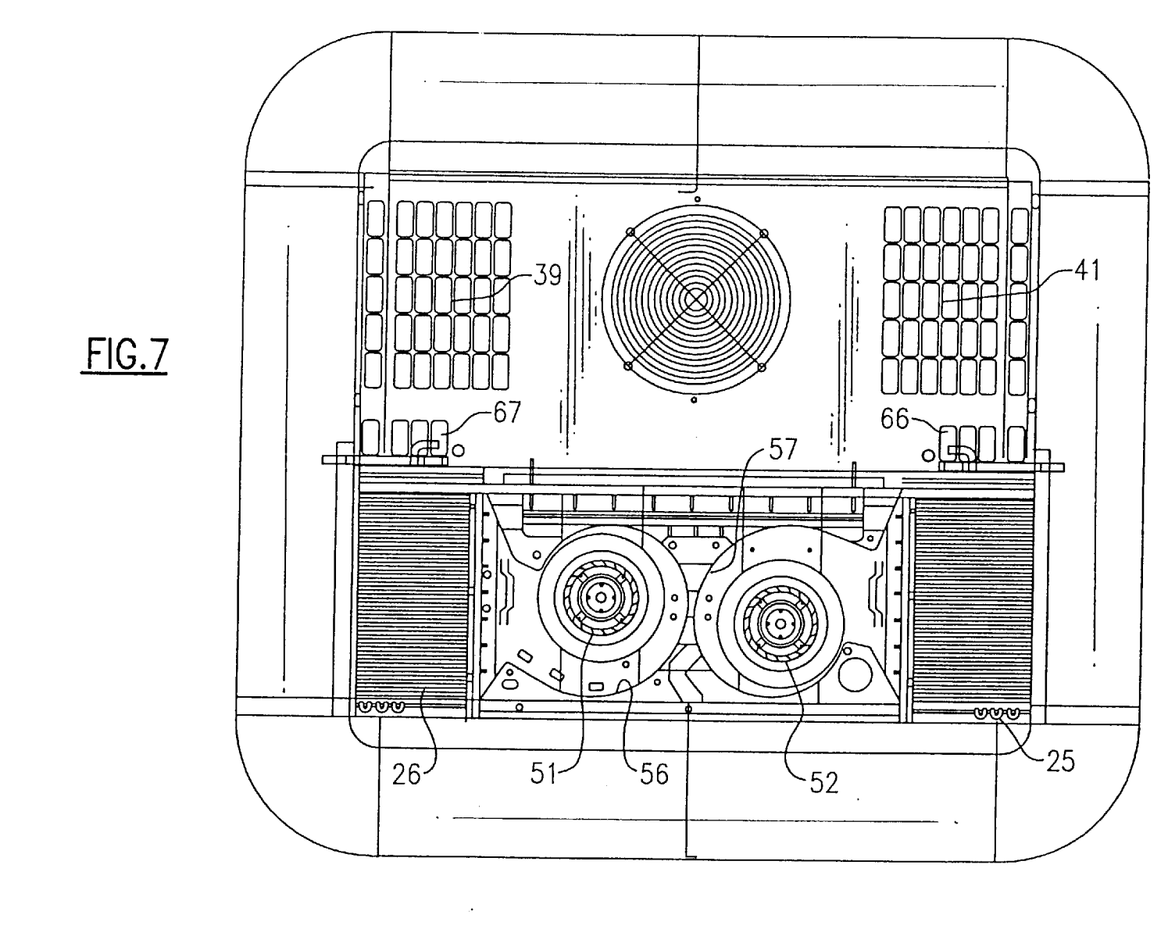
FIG. 7 is a top view of a single unit module in accordance with the present invention.

Considering now the evaporator section 37 as shown in FIG. 3, and in a different perceptive in FIGS. 4, 6 and 7, in addition to the evaporator coils 25 and 26 that are located near the ends of the evaporator section 37, a pair of evaporator fans 51 and 52, as driven by the motors 23 and 24, respectively, are provided. Further, just outside of the evaporator coils 25 and 26 are the respective heating coils 53 and 54.

In operation, the evaporator blower fans 51 and 52 draw in return air from the passenger compartment of the bus, pass it through the scroll structures 56 and 57 (see FIG. 7), pass it through the coils as described hereinabove in order to heat or cool the air, and then return it to the passenger compartment of a bus.

Returning now to the discussion of the "frameless" or "unibody" construction, with respect to the evaporator section 37, reference is made primarily to FIG. 4. Similar to the condenser section 36, a pair of spaced central panels, one of which is shown at 58, extends over most of the length of the module 37. However, its oblique ends are attached to the tube sheets of the coils 25 and 26, and the opposite edge of the tube sheets are then attached to the triangular shaped side panels 59 and 61 to complete the side structure of the module 37. End panels 62 and 63 are then interconnected between the respective side structures as shown. Thus, in the same manner as described hereinabove with respect to the condenser section 36, the tube sheets of the heat exchanger coils 25 and 26 are interconnected with other elements of the module structure to collectively form a framework in a unibody fashion.

Referring again to FIGS. 6 and 7, further discussions of the air flow through the evaporator unit 37 is warranted. As mentioned hereinabove, the module as shown in FIG. 6 straddles the longitudinal centerline of a bus as it extends transversely across the rooftop of the bus. Depending on the type and size of the bus, the position(s) of the return air opening(s) may vary substantially in the longitudinal direction and also in the lateral direction. For example, in a relatively narrow bus, one or more return air openings are more likely to be at or near the longitudinal centerline of the bus, whereas with a wide bus installation, it is likely that a pair of return air openings will be located on either side, and at a substantial distance from the longitudinal centerline of the bus. The present module is therefore designed to accommodate these various installations requirements with a single module design. The design features which accommodate the various lateral locations of the return air opening will now be discussed, and the features which accommodate the various longitudinal positions of the return air opening will be discussed hereinafter.

As will be seen in FIG. 6, a relatively long (in the transverse direction) return air plenum 64 is provided between the lower inner edges of the respective evaporator coils 25 and 26. The length of that plenum is shown at $L_1$, and is such that the return air opening(s) can be located anywhere along that length, such that fluid communication will be provided between these return air openings and the evaporator fans 51 and 52. This dimension $L_1$ can be quantified by comparing it with the overall length, $L_2$, of the unit (not including the cowlings that are added to accommodate the flow of the air to the supply air openings in the bus by way of the conduits 68 and 69). Thus, the ratio $L_1/L_2$ of the present design is 1190 mm/1450 mm or about 82%.

Another way to quantify the dimension $L_1$ is to compare it with the width of a bus top. A typical bus top has an average transverse width of about 2150 mm. Thus, the ratio of $L_1/L_3$ equals 1190/2150 or about 55%.

In operation, the relatively warm return air flow upwardly from a one or more return air openings and enters the return air plenum 64. The evaporator fans 51 and 52 cause the return air to flow upwardly to their inlets at the top, and at the same time, fresh air may be brought in by way of the fresh air openings 66 and 67 (see FIG. 7). A mixture of the two air flows streams is thus admitted at the intake of the evaporator fans 51 and 52 and caused to flow outwardly through the evaporator coils 25 and 26, the heating coils 53 and 54, and finally to flow through the supply air conduits 68 and 69 to the supply air inlets to the bus.

So far, the discussion has been with respect to a single unit configuration wherein the module includes a single condenser section 36 and a single evaporator section 37, and with the condenser section including an inverter/controller and a compressor.

Figure 8:
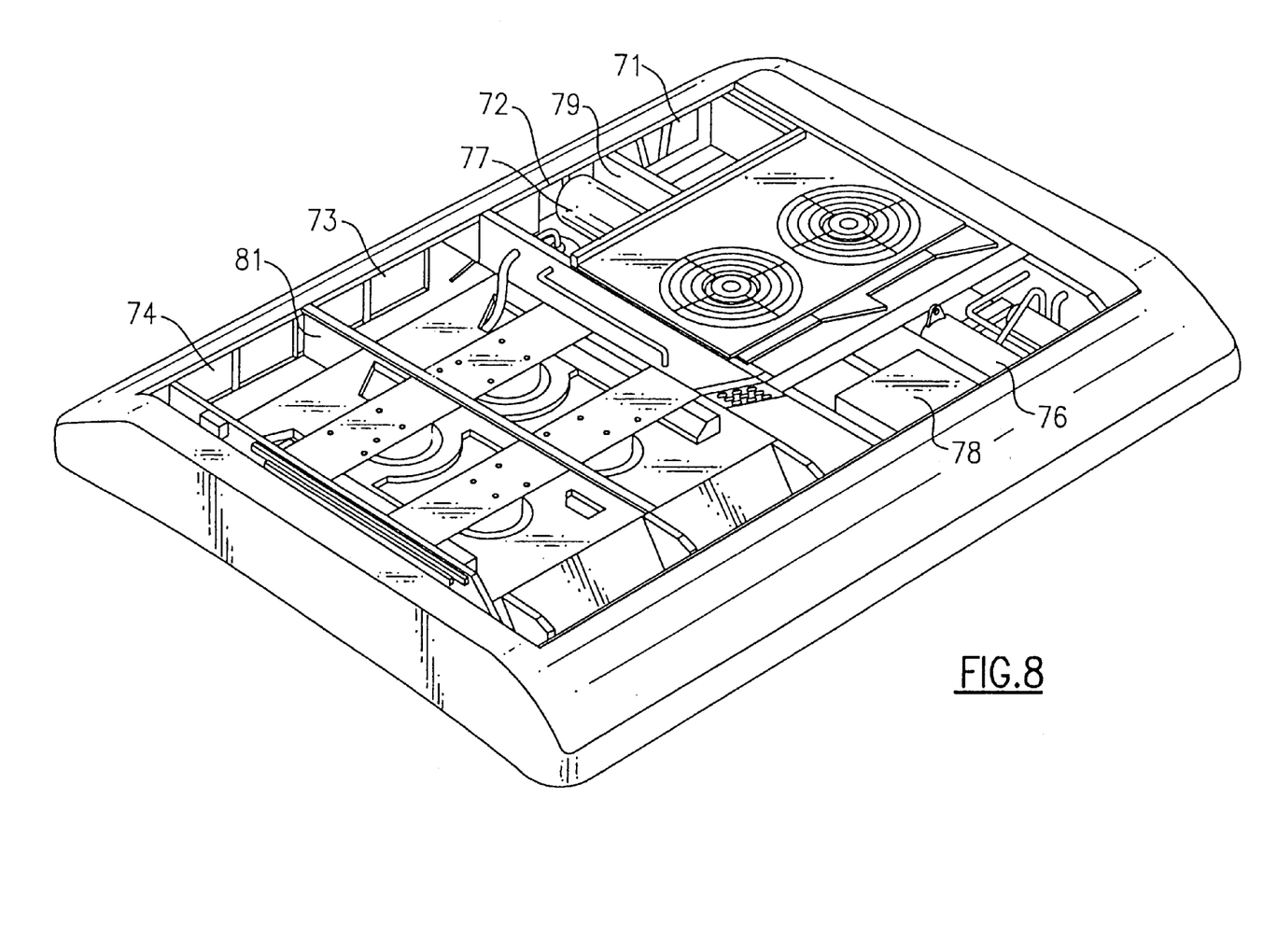
FIG. 8 is perspective view of a double unit module in accordance with the present invention.

In the interests of economy and that of accommodating various air conditioning capacities with simple and effective combination that can be easily adapted through the return air and supply air openings in the bus rooftop, a double unit configuration has been devised as shown in FIG. 8. Here, rather than a single condenser section, a pair of condenser sections 71 and 72 are provided adjacent each other. Similarly, rather than a single evaporator section, a pair of evaporator sections 73 and 74 are provided adjacent each other as shown. Within each of the condenser sections 71 and 72, respective compressors 76 and 77 are provided. However, when combining the condenser sections in this manner, it is not necessary to provide two inverters/controllers, since a single inverter/controller 78 will suffice for the entire double unit module configuration. Most of the other components of the condenser sections 71 and 72 are identical to those for the single unit configuration. However, rather than providing four condenser coils, on each side of the condenser fan the adjacent coil pairs are joined to form a single coil with a central tube sheet 79 extending the length of the unit as shown. In this way, the combination of the two condenser sections 71 and 72 provide twice the capacity as that of a single section configuration, costs are reduced because of the use of two long condenser coils rather than four short ones, and the cost of one inverter/controller is saved.

Referring now to the evaporator section 73 and 74, in the same manner as described hereinabove with respect to a condenser section coils, the evaporator coils of the adjacent sections 73 and 74 are joined to form two long coils rather than four short coils, and again, a center tube sheet 81 is provided to extend across the length of the unit, between the sections 73 and 74.

In addition to the savings that result from use of two long coils rather than four short coils, this design positions the fans of the two adjacent sections 73 and 74, along with their return air plenum, right next to each other. This allows for the two return air inlet plenums to have their respective return air openings longitudinally adjacent to each other (or combined in a single opening) as will now be described.

With the use of one or more single unit configurations, and one or more double unit configurations as described hereinabove, a combination may be used to obtain a total capacity that meets the needs of the particular bus installation. Further, because of the ability to place the evaporator sections in adjacent positions, the adaptation of the various units can be easily made to register with a single return air opening, irrespective of the capacity level.

Figure 9A:
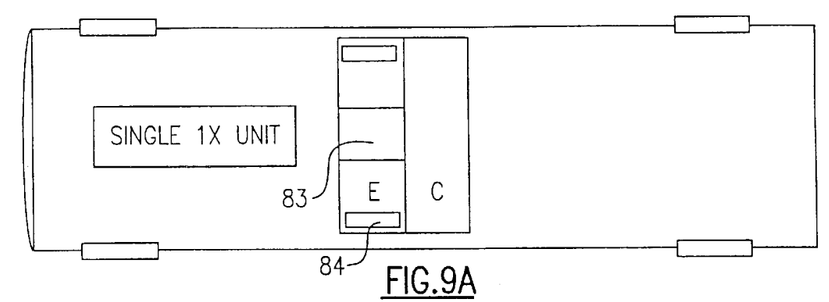
FIGS. 9A thru 9D show various possible configurations of a system made up of single and double unit modules.

Referring now to FIG. 9a, a single unit configuration is shown with a single condenser section C and a single evaporator section E, with a relatively short (longitudinally) return air opening 83 and supply air openings 84.

Figure 9B:
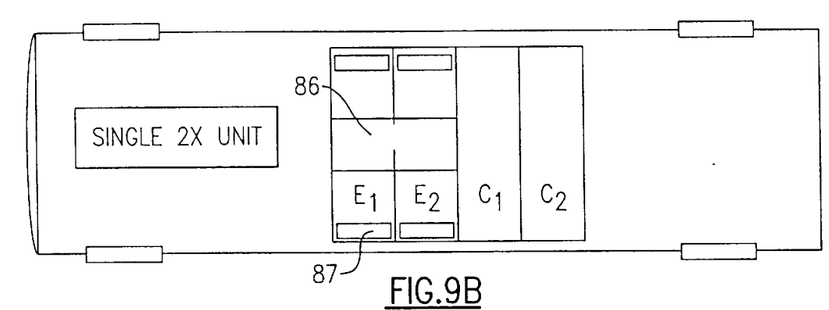

In FIG. 9b, a double unit module is shown with a pair of condenser sections C1 and C2 and a pair of evaporator sections E1 and E2. A single return air opening 86 extends longitudinally over twice the length as the return air opening 83 and the supply air openings 87.

Figure 9C:
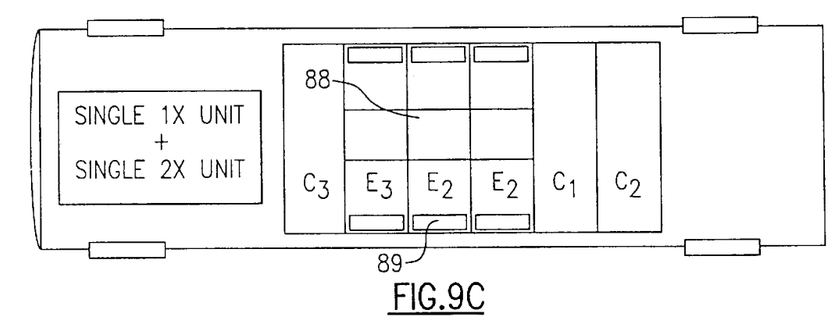

In FIG. 9c, a double unit configuration is provided as in FIG. 9b, and then a single unit configuration, as shown in FIG. 9a, is rotated 180° and is then installed such that its evaporator section 83 is adjacent the other evaporator section E1. In this way, each of the evaporator sections E1, E2 and E3 can share a single return air opening 88 and a single supply air opening 89 on each side as shown.

Figure 9D:
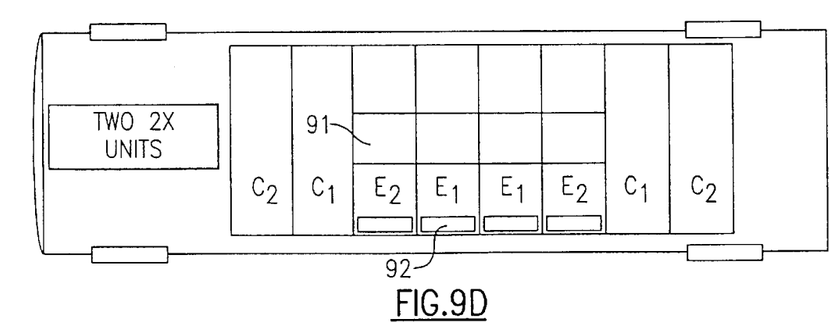

Finally, in FIG. 9d, a double unit module (as shown in FIG. 9b) is provided, and then another identical double unit module is rotated 180° and installed such that the four evaporator sections are disposed adjacent each other and therefore share a common single return air opening 91. Similarly the evaporator sections also share a common supply air opening 92 on each side as shown.

While the present invention has been particularly shown and described with reference to a preferred embodiment as illustrated in the drawings, it will be understood by one skilled in the art that various changes and detail may be effected therein without defining from the true sprit and scope of the invention as defined in the claims.

We claim:

1. An air conditioning module for installation on the roof of a bus comprising:
    a refrigeration circuit for the circulation of refrigerant therethrough and including a compressor, at least one condenser coil, an expansion valve and at least one evaporator coil;
    at least one condenser fan for the circulation of ambient air through said at least one condenser coil;
    at least one evaporator fan for the circulation of air from a return air opening in the bus through said at least one evaporator coil and to a supply air opening in the bus;
    a first condenser section structural member disposed in a plane substantially normally to a plane of said at least one condenser coil and rigidly attached to one side of a tube sheet of said at least one condenser coil;
    a second condenser section structural member disposed in the same plane as said first condenser section structural member and rigidly attached to another side of said tube sheet of said at least one condenser coil;
    wherein said first and second structural members, together with said condenser coil tube sheet, form rigid member for the support of said at least one condenser fan.

2. An air conditioning module as set forth in claim 1 and including a third condenser section structural member disposed in a plane that is substantially parallel to the plane of said first and second condenser section structural members and rigidly attached to one side of another tube sheet of said at least one condenser coil; and
    a fourth condenser section structural member disposed in the same plane as said third condenser section structural member and rigidly attached to the other side of said other tube sheet of said at least one condenser coil;
    said third and fourth structural members, together with said other condenser coil tube sheet, also forming a part of said body.

3. An air conditioning module as set forth in claim 1 wherein said at least one condenser coil comprises a pair of condenser coils with each having first and second condenser section structural members attached to a tube sheet thereof, and with all the structural members being in the same plane.

4. An air conditioning module as set forth in claim 3 wherein one of said condenser section structural members is disposed between and attached to the tube sheets of each of said pair of condenser coils.

5. An air conditioning module as set forth in claim 1 and including a first evaporator section structural member disposed in a plane substantially normal to a plane of said at least one evaporator coil and rigidly attached to one side of a tube sheet of said at least one evaporator coil; and
    a second evaporator section structural member disposed in a plane of said first evaporator section structural member and rigidly attached to another side of a tube sheet of said at least one evaporator coil;
    wherein said first and second evaporator section structural members, together with said evaporator coil tube sheet form a part of the body.

6. An air conditioning module as set forth in claim 5 wherein said at least one evaporator coil comprises a pair of evaporator coils and further including a third evaporator section structural member disposed in the plane of said first and second evaporator section structural members and rigidly attached to the tube sheet of said second evaporator coil; and
    a fourth evaporator section structural member disposed in the same plane as said third evaporator section structural member and rigidly attached to the other side of said second evaporator coil tube sheet; said third and forth structural members, together with an attached tube sheets, forming a part of the body.

7. An air conditioning module as set forth in claim 6 wherein one of said evaporator sections structural members is disposed between and attached to the respective tube sheets of said pair of evaporator coils.

8. A method of constructing an air conditioning module for a bus rooftop comprising the steps of providing at least one condenser coil and associated fan for circulating air through said condenser coil, said condenser coil having a pair of spaced tube sheets at its end;
    providing at least one evaporator coil and associated fan for circulating air through said evaporator coil; and
    providing at least a pair of planar structural members with each being attached at an edge to one of said tube sheets, such that the pair of planar structural members, together with the attached one of said tube sheets, collectively form a rigid member for supporting said fan.

9. A method as set forth in claim 8 wherein said rigid support structure is adapted to extend transversely across the roof of a bus.

10. A method as set forth in claim 8 wherein said planar structural members are attached to one of said tube sheets by fasteners.

11. A method as set forth in claim 8 and including the further step of providing a second pair of planar structures and attaching them to the other of said pair of spaced tube sheets such that the second pair of planar structural members, together with the other tube sheet, collectively form a rigid member for supporting said fan.

12. A method as set forth in claim 8 wherein said planar structural members are attached to tube sheets of said at least one condenser coil.

13. A method as set forth in claim 8 wherein said planar structural members are attached to a tube sheet of said at least one evaporator coil.

14. A method as set forth in claim 12 wherein said at least one condensing coil comprises two condensing coils and further wherein a structural member is attached between said two condenser coil.

15. A method as set forth in claim 13 wherein said at least one evaporator coil comprises two evaporator coils and further wherein a structural member is attached between the two evaporator coils.

* * * * *